Feb. 3, 1970  R. J. EXTON  3,493,303
SPECTROGRAPH ALIGNMENT SYSTEM
Filed Feb. 17, 1966
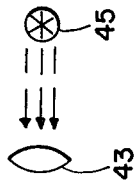
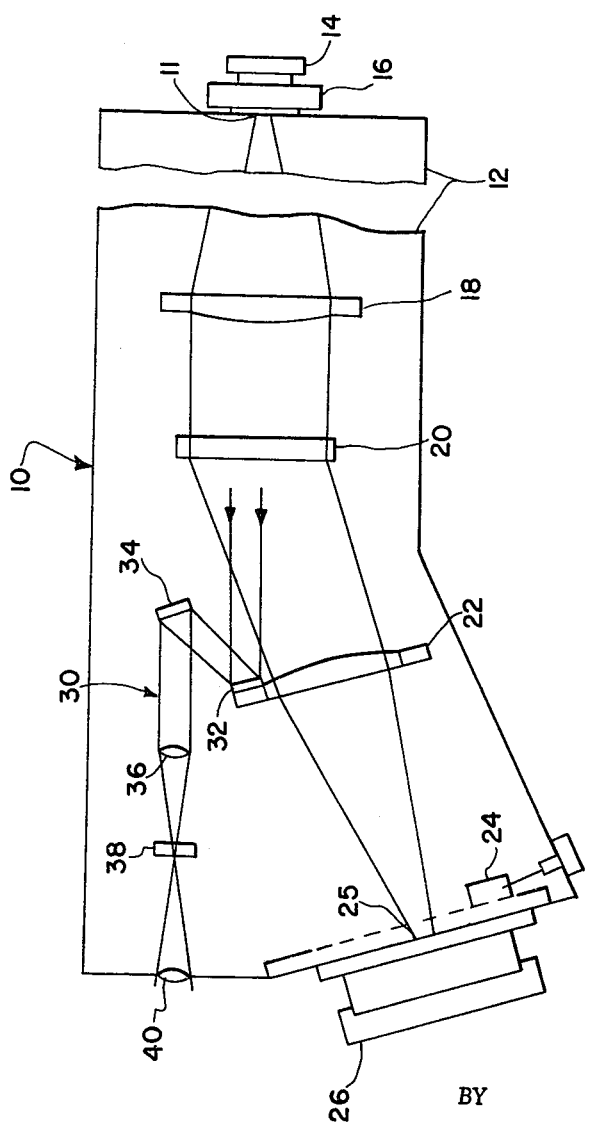
INVENTOR
REGINALD J. EXTON
BY
*G. H. McCoy*
*Howard J. Osborn*
ATTORNEYS United States Patent Office 3,493,303
Patented Feb. 3, 1970

3,493,303
SPECTROGRAPH ALIGNMENT SYSTEM
Reginald J. Exton, 111 Ware Road,
Williamsburg, Va. 23185
Filed Feb. 17, 1966, Ser. No. 529,607
Int. Cl. G01j 3/40
U.S. Cl. 356—76                                 9 Claims

ABSTRACT OF THE DISCLOSURE

An alignment system for a portable spectrograph instrument. The spectrograph is carried to the vicinity of the object to be examined. The light from the object is received by the instrument. At least a portion of the light is transmitted through the instrument to a position where it can be observed by the human eye. The instrument is moved in accordance with the intensity of the light observed to accomplish alignment.

---

The invention described herein was made by an employee of the United States Government and may be manufactured and used by or for the Government for governmental purposes without the payment of any royalties thereon or therefor.

This invention relates to a spectographic alignment system, and more particularly to a system which provides for alignment thereof by viewing directly through the spectograph.

In general, spectographs are large and bulky and are intended to be utilized in a permanent setup where the source to be examined can be adjusted. To accomplish alignment, components of the optical system are adjusted as well as the source. This type of instrument is particularly cumbersome, and difficult to set up when used in various environments. One such environment is that of viewing a model in a high speed, high temperature wind tunnel. In this environment, the model is normally fixed, thus it is difficult to move the source to provide for alignment. Accordingly, the alignment must be accomplished by moving the spectograph optical components. Additionally, difficulty with working through the walls of the wind tunnel is encountered. Alignment is further complicated by the fact that the source is not radiating at the time of alignment.

To overcome these difficulties, a spectograph has been produced with a telescopic sighting arrangement which assists in alignment for a given range of focal distance. Although this arrangement improves the alignment difficulties previously encountered, a major problem still exists. Using this technique the illumination at the light-admitting slit cannot be verified. It is, therefore, apparent that although the telescope sighting provides a general alignment, the old method of manipulating optical components is still necessary to assure the desired image at the spectrograph slit.

The present invention overcomes the above-mentioned difficulties by providing a spectrograph alignment system wherein the source is viewed directly through the instrument. Since the source itself can be inspected, it is an easy matter to determine visually the intensity of the light being admitted, thus, assuring the desired illumination and/or image at the slit and optimum alignment.

It is, therefore, an object of this invention to provide a spectrograph having an alignment system providing ease of alignment and being truly portable.

Yet another object of the invention is to provide a spectrograph including an alignment system wherein the spectrograph can be easily aligned to the source without adjusting the source.

Still another object of the invention is to provide a spectrograph having an alignment system wherein the source is viewed directly through the spectrograph instrument.

A further object of the invention is to provide a spectrograph alignment system wherein the illumination from the source can be viewed to provide optimum alignment.

An additional object of the invention is to provide a spectrograph alignment system wherein the entire source can be viewed (slitless mode) or a slit utilized (standard procedure).

Yet another object of the invention is to provide a spectrograph alignment system wherein the spectrograph can be properly aligned by illuminating the source with lighting apparatus.

An added object of the invention is to provide a spectrograph alignment system which consists of a minimum number of components which are easy to assemble, are rugged in design, are economical to manufacture and maintain.

Another object of the invention is to provide a spectrograph alignment system wherein the "zero order" of the spectrum is used for alignment purposes.

These and other objects and advantages of the invention will become more apparent upon reading the specification in conjunction with the accompanying drawing.

In the drawing, the figure is a schematic view in elevation showing the spectrograph and its alignment system.

Basically, this invention relates to an instrument for analyzing spectra, and more particularly to its alignment system wherein the source may be viewed directly through an instrument such as a grating spectrograph. The spectrograph includes the usual optical components including a housing having at one end means for admitting light such as a slit and/or shutter. Rearward of the shutter is located a lens for directing the light admitted from the slit on a grating, prism, or other device for breaking the light into its spectra. Mounted behind the grating is another lens which focuses the light from the grating onto photographic or photoelectric equipment for recording the spectra. The alignment system consists of a pair of mirrors, one of which is aligned with the slit and located rearward of the grating. This mirror reflects "zero order" light onto a second mirror which is aligned with a focusing lens and eyepiece, the eyepiece being mounted in the end of the spectrograph housing. An optical aid is mounted between the eyepiece and the lens to facilitate alignment. Thus, by observing through the eyepiece, the source itself, or light emitted therefrom may be directly examined to properly align the instrument.

Referring now more specifically to the details of the invention, the figure shows the spectrograph and alignment system associated therewith, designated generally by the reference numeral 10.

The spectrograph 10 is of rather conventional design, and includes a housing 12 which is generally rectangular in cross section and when viewed along its length. The housing is offset to accommodate the optics of the spectrograph and the associated alignment system. The housing may be constructed from metal, plastic, or any material which will provide a properly sealed enclosure. An aperture 11 is provided in one end of the housing 12 (the forward end) to admit light from an iluminated source. Associated with the aperture 11 is a shutter 16 which is removably secured to the housing in a conventional manner such as by screws or a threaded coupling arrangement. Also removably mounted on the shutter is a slit 14 which has bilateral adjustment. In actual construction of the device, an Alphax shutter capable of speeds down to 100th of a second was utilized. It should be understood, however, that the use of another type shutter and/or slit is deemed to be well within the purview of one skilled in the art.

Mounted in the housing 12, rearward of the shutter and slit, is a lens 18. The particular lens utilized in constructing the device was an f/3 achromatic lens. Again, it is to be understood that the particular lens utilized is deemed to fall within the option of one skilled in the art and this particular lens was chosen in order to enhance optical speed.

Mounted behind the lens 18 is a transmission grating 20. The particular grating utilized was one having 600 grooves per millimeter with a ruled area of 84 by 84 millimeters. The grating was used in the first order for a linear reciprocal dispersion of 71 angstroms per millimeter. Resolutions of 5 angstroms has been obtained using a 30-micron slit, and a wavelength range of approximately 3500–6500 angstroms. Obviously, other gratings may be utilized and fall within the confines of the invention.

Mounted behind the grating 20 in the housing offset is a lens 22 which is also an f/3 achromatic lens for the reasons and purposes discussed above.

An aperture 25 is formed in the other end of the housing 12 to allow light from the grating 20 and lens 22 to be projected on a film holder 26. The film holder 26 is secured in a releasable manner to the housing 12 in a conventional manner. The particular film utilized is the fastest film speed available at the present time (ASA ratings of 3,000 to 10,000). The particular camera and film utilized was merely for purposes of a particular spectrograph setup, obviously other cameras and films might be utilized and fall within the scope of the invention.

A mechanical shutter 24, of commercially available design, may be placed in front of the camera to protect the film from exposure during alignment. If the particular camera utilized has its own shutter, this might be utilized.

The alignment system per se is designated generally by the reference numeral 30. The alignment system includes a pair of mirrors 32 and 34, the first of which is mounted on the periphery of lens 22. The mirror 32 is positioned on the periphery of lens 22 such that it is line of sight with the slit 14. With this arrangement the "zero order" of the light is intercepted. If another order is utilized the mirror is positioned accordingly. The mirror 34 is mounted forward of the mirror 32 in the housing 12. It is so positioned that light reflected from the mirror 32 is beamed directly thereon. In alignment with the mirror 34 is mounted a sighting lens 36, a sighting aid in the form of a crosshair 38, and an eyepiece 40 positioned in the end of the housing 12. The eyepiece 40 is mounted and positioned in a manner such that it is easy for the individual aligning the spectrograph to look through the eyepiece.

The source 45 is shown diagrammatically, and may be the nose of a model in a wind tunnel, the leading edge of a model wing, or any other source which emits light and it is desired to inspect the spectra thereof. An external lens 43 is located between the source and the slit to image the source on the slit as in the normal case of a spectrograph arrangement. Although not shown, it is understood that the spectrograph is to be mounted on some type of support, such as a tripod or similar instrument which will allow movement thereof in various directions and fixing it in position when the device is properly aligned. Also, an optical bar may be attached to the spectrograph and a mercury source positioned to the entrance slit for quick wave length calibration.

OPERATION

From the above description of the spectrograph alignment system apparatus, the operation thereof is believed to be apparent; however, for purposes of clarity it will be explained in detail.

For purposes of illustration, it will be assumed that the source 45 is a nose cone of a spacecraft reentry vehicle. This source 45 is mounted in a supersonic, high temperature, wind tunnel. Normally the tunnel is not operating so the source is illuminated by a flood light or similar apparatus. Obviously, if the tunnel is operating the source will generate its own illumination. The spectrograph 10 is mounted on a tripod or similar stabilizing instrument and generally pointed in the direction of the source. The shutter 24 is closed to protect the film in the camera 26, and the shutter 16 opened such that light from the source may be emitted through the slit 14. With the light from the source 45 being admitted through the slit 14, the operator can move the instrument and visually determine the alignment of the spectrograph. It is a simple matter to visually determine the desired (often greatest) amount of illumination at the slit. When the desired illumination is visualized, it has been determined that the spectrograph is properly aligned. The operation of the particular sighting arrangement is believed to be obvious. The admitted light passes through the lens 18, grating 20 and on to the mirror 32. The light is then reflected to the lens 34, focused by the sighting lens 36 onto the sighting aid 38 and appears at the eyepiece 40. By using the "zero order" the greatest amount of light available is presented at the eyepiece. Since the light from the source is viewed directly, it is a simple matter to move the spectrograph until the point of greatest intensity or some other point to be analyzed by the eye. When this is accomplished the spectrograph is properly aligned for the necessary purpose of photographing the spectra thereof. After alignment is accomplished, the camera is operated in the usual manner to photograph the spectra of the source.

From the above description, it becomes apparent that the spectrograph and its alignment system is of a highly portable nature. Furthermore, it provides a means whereby the intensity of the source emission may be determined by viewing the slit which admits the light to the spectrograph. Also, the slit and shutter arrangement may be completely removed to give a wide viewing area. This is particularly useful when studying a moving source such as a star or reentry vehicle. The alignment system is of an extremely simple design, and provides a rugged, economical, and easily maintained arrangement. The spectrograph can be readily aligned with the source, necessity of adjusting the source having been eliminated. The alignment system is subject to use with a spectrograph utilizing various types of optical components.

While a preferred embodiment of this invention has been described, it will be understood that modification and improvements as incorporate the principles of the invention are to be considered as included in the hereinafter appended claims unless these claims by their language expressly state otherwise.

What is claimed as new and desired to be secured by Letters Patent of the United States is:

1. A spectrograph alignment system or the like comprising a spectrograph; said spectrograph having a housing with an offset portion; slit and shutter structure mounted in one end of the housing for admitting light from a source; a first lens spaced from and mounted behind said shutter in said housing; a grating spaced from and mounted behind said first lens; a second lens spaced from and mounted behind said grating in said housing offset portion; a film holder mounted in the other end of said housing and being aligned with said second lens; a shutter mounted in said housing between said second lens and film holder; a first mirror carried by said second lens and being aligned with said first lens and said slit; a second mirror mounted in said housing and being spaced from and at an angle to said first mirror to receive reflection therefrom; a sighting lens aligned with said second mirror for focusing the reflection therefrom; an eyepiece for viewing the output from the sighting lens; and a crosshair device located between the sighting lens and eyepiece to facilitate aligning the spectrograph.

2. A spectrograph alignment system or the like comprising: a spectrograph having a housing; said housing having means for admitting light from a source; a lens mounted in said housing for directing the light received from the source; means for breaking up the light from said lens into its spectra; means mounted in said housing for viewing a portion of said spectra, means mounted in said housing intermediate said means for breaking up the light and said viewing means for directing a portion of said spectra to said viewing means, whereby said spectrograph may be aligned with said source by directing the most intense portion of said spectra to said viewing means.

3. A spectrograph alignment system or the like as in claim 2 wherein said means for breaking up the light is a grating; and said means for directing light from said grating is a mirror system.

4. A spectrograph alignment system or the like as in claim 2 wherein said means for breaking up the light is a grating; said means for viewing the directed light is a lens, a sighting aid and eyepiece.

5. A spectrograph alignment system or the like as in claim 2 wherein said means for breaking up the light is a grating; said means for directing light from said grating is a mirror system, and said means for viewing the directed light is a lens, a sighting aid and eyepiece.

6. A spectrograph alignment system or the like as in claim 2 wherein said means for breaking up the light is a grating; said spectrograph having a lens for focusing light from said grating; said means for directing light from said grating being a mirror system, and one of the mirrors of said system being mounted in said housing so as to reflect the "zero order" from said grating.

7. A spectrograph alignment system or the like as in claim 6 wherein said mirror system has another mirror for reflecting light from said first-mentioned mirror; a sighting lens for focusing the light reflected from said last-mentioned mirror; and an eyepiece mounted in said housing and aligned with said sighting lens to view the light focused thereby.

8. A spectrograph alignment system as in claim 7 wherein a crosshair is located between the eyepiece and sighting lens to facilitate alignment; said sighting lens focusing the image on the crosshairs.

9. A spectrograph alignment system as in claim 2 wherein said means for admitting light is a slit and shutter; said means for breaking up the light being a grating; a focusing lens mounted in said housing for receiving light from said grating; a camera mounted in said housing for photographing the transmission from said focusing lens; and a mechanical shutter operative in said housing and associated with said camera to prevent film exposure during spectrograph alignment.

References Cited

UNITED STATES PATENTS

| 1,902,109 | 3/1933 | Twyman. |
|---|---|---|
| 2,179,657 | 11/1939 | Estey. |
| 2,577,807 | 12/1951 | Pryor. |
| 2,835,167 | 5/1958 | Pierce. |
| 3,025,744 | 3/1962 | Collyer et al. |
| 3,080,788 | 3/1963 | Saunderson. |
| 3,090,278 | 5/1963 | Saunderson. |
| 3,173,983 | 3/1965 | Engle. |
| 3,229,566 | 1/1966 | Hutchinson et al. |

FOREIGN PATENTS

| 160,859 | 2/1964 | USSR. |
|---|---|---|
| 462,595 | 1/1950 | Canada. |
| 664,233 | 8/1938 | Germany. |

OTHER REFERENCES

Bausch & Lomb, Quartz Spectrograph, March 1932, pages 2–13.

Hiltner & Code, Stellar Photoelectric Spectrophotometry, J.O.S.A., vol. 40, No. 3, March 1950, pp. 149–152.

RONALD L. WIBERT, Primary Examiner

T. MAJOR, Assistant Examiner

U.S. Cl. X.R.

356—79